United States Patent [19]

Arnold et al.

[11] Patent Number: 4,960,853
[45] Date of Patent: Oct. 2, 1990

[54] RIGID ROD AROMATIC BENZOXAZOLE/THIAZOLE HETEROCYCLIC COPOLYMERS

[75] Inventors: Fred E. Arnold, Centerville; Jerry L. Burkett, Troy, both of Ohio

[73] Assignee: The United States of America as Represented by the Secretary of the Air Force, Washington, D.C.

[21] Appl. No.: 411,777

[22] Filed: Oct. 23, 1989

Related U.S. Application Data

[62] Division of Ser. No. 227,979, Jul. 29, 1988, Pat. No. 4,900,806.

[51] Int. Cl.$^5$ .............................................. C08G 75/32
[52] U.S. Cl. ...................................... 528/183; 528/176; 528/179; 528/337; 528/342; 528/348
[58] Field of Search ............... 528/183, 176, 179, 337, 528/342, 348

[56] References Cited

U.S. PATENT DOCUMENTS

| | | | |
|---|---|---|---|
| 4,108,835 | 8/1978 | Arnold et al. | 528/183 |
| 4,131,748 | 12/1978 | Arnold et al. | 562/488 |
| 4,533,692 | 8/1985 | Wolfe et al. | 524/417 |
| 4,533,693 | 8/1985 | Wolfe et al. | 524/417 |
| 4,900,806 | 2/1990 | Arnold et al. | 528/337 |

Primary Examiner—Harold D. Anderson
Attorney, Agent, or Firm—Charles E. Bricker; Donald J. Singer

[57] ABSTRACT

There are provided copolymers having repeating units of the formula

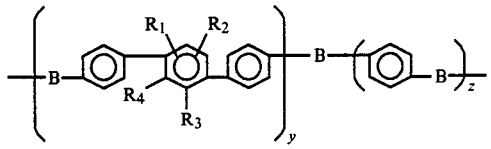

wherein $R_1$ is —H or

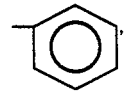

$R_2$ is

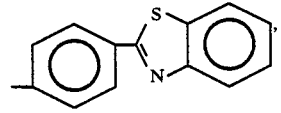

$R_3$ is

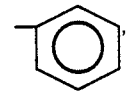

and $R_4$ is $R_2$ or

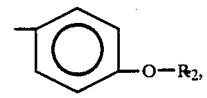

and B is

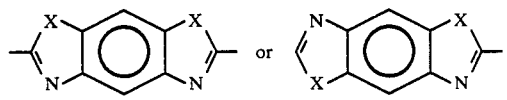

wherein X is —S—, —O— or —NH—; and wherein y ranges from about 0.02 to 0.20 and z is 1.0-y.

11 Claims, No Drawings

RIGID ROD AROMATIC BENZOXAZOLE/THIAZOLE HETEROCYCLIC COPOLYMERS

RIGHTS OF THE GOVERNMENT

The invention described herein may be manufactured and used by or for the Government of the United States for all governmental purposes without the payment of any royalty.

This is a division of application Ser. No. 227,979, filed Jul. 29, 1988, now U.S. Pat. No. 4,900,806.

BACKGROUND OF THE INVENTION

This invention relates to high molecular weight benzobisazole polymers containing pendent benzthiazole groups.

In general, the class of aromatic heterocyclic extended chain polymers are well known for their outstanding thermal, physical and chemical properties. These polymers generally exhibit excellent modulus and tenacity properties, but lack good properties when in compression, which limits their use as reinforcing structural fibers.

It is an object of the present invention to provide aromatic heterocyclic copolymers which exhibit improved compressive properties.

Other objects, aspects and advantages of the present invention will be apparent to those skilled in the art from a reading of the following detailed disclosure of the invention.

SUMMARY OF THE INVENTION

In accordance with the present invention there are provided copolymers having repeating units of the formula

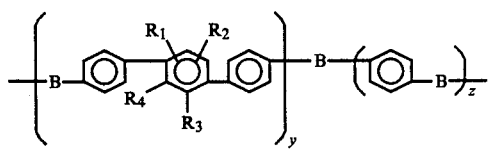

wherein $R_1$ is —H or

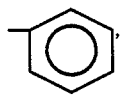

$R_2$ is

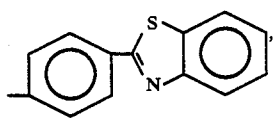

$R_3$ is

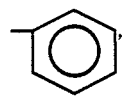

and $R_4$ is $R_2$ or

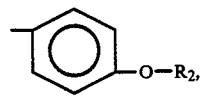

and B is

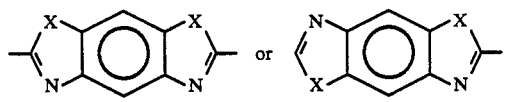

wherein X is —S—, —O— or —NH—; and wherein y ranges from about 0.02 to 0.20 and z is 1.0—y.

DESCRIPTION OF THE PREFERRED EMBODIMENTS

The copolymers of this invention are prepared by the polycondensation of 4,6-diaminoresorcinol dihydrochloride,
2,5-diaminohydroquinone dihydrochloride,
4,6-diamino-1,3-benzenedithiol dihydrochloride,
2,5-diamino-1,4-benzenedithiol dihydrochloride or
1,2,4,5-tetraaminobenzene tetrahydrochloride with terephthalic acid and a phenylbenzthiazole-substituted p-terphenylene dicarboxylic acid of the formula

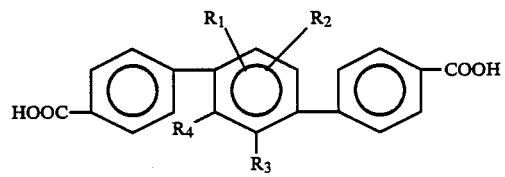

wherein $R_1$ is —H or

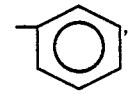

$R_2$ is

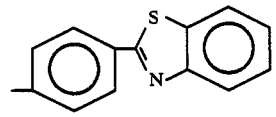

$R_3$ is

and $R_4$ is $R_2$ or

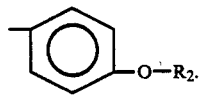

Preparation of the phenylbenzthiazole-substituted p-terphenylene dicarboxylic acid is described in our co-pending application Ser. No. 227,978, filed Jul. 29, 1988 now U.S. Pat. No. 4,892,953.

In conducting the process, the amino hydrochloride monomer may be mixed with polyphosphoric acid, (PPA) then heated, under vacuum or an inert gas atmosphere to about 70° to 130° C. over a period of about 3 to 24 hours, to dehydrochlorinate the amino monomer. At the end of this period, the phenylbenzthiazole-substituted p-terphenylene dicarboxylic acid and terephthalic acid are added. An additional amount of phosphorous pentoxide and/or PPA may be added as required to provide a stirrable mixture. Alternatively, the amino hydrochloride and dicarboxylic acid monomers may be mixed with polyphosphoric acid, then heated, under vacuum or an inert gas atmosphere to about 70° to 130° C. over a period of about 3 to 24 hours, do dehydrochlorinate the amino monomer. Equimolar amounts of the amino monomer and the total of the dicarboxylic acid monomers are generally used. The molar ratio of the phenylbenzthiazole-substituted p-terphenylene dicarboxylic acid to the terephthalic acid can be in the range of about 1:49 to 1:4. The amount of PPA used is that which is sufficient to provide a stirrable mixture. In general the concentration of monomers in the acid ranges from about 10.0 to 15.0 percent.

Following dehydrochlorination, the reaction mixture is heated at a temperature in the range of about 75° to 225° C. for a period ranging from 24 to 96 hours. Preferably, the polymerization is carried out in stages, i.e., a step-wise heating schedule is employed. Step-wise heating is preferred because immediately exposing the reaction mixture to relatively high polymerization temperatures may cause decomposition of the monomers. The selection of a particular step-wise heating schedule is obvious to one of ordinary skill in the art. At the end of the reaction period, the polymer solution is in a very viscous or semi-solid state. After cooling, the product is washed repeatedly with water while stirring, after which it is dried under a high vacuum at an elevated temperature.

The molecular weight of these copolymers is commonly indicated by the inherent viscosity of the copolymer. The inherent viscosity is commonly determined at a concentration of 0.2 weight/volume percent in methanesulfonic acid at 30° C.

The copolymers produced in accordance with the process of the present invention may be used to produce fibers and sheets. In order to form these copolymers into fibers or sheets, dopes are prepared containing about 5 to 15 weight percent of the copolymer in a strong acid, such as sulfuric acid, methanesulfonic acid, chlorosulfuric acid, and the like, including mixtures thereof. Such dopes may be spun or extruded into a coagulation bath comprising water or a water/methanesulfonic acid mixture.

The following examples illustrate the invention

EXAMPLE I

A mixture of 4,4''-dicarboxy-2',5'-diphenyl-3',6'-[2-(4-phenylbenzthiazole)]-p-terphenyl (0.1778 g 0.2 mmol), 2,5-diamino-1,4-benzenedithiol dihydrochloride (4.9 g, 20 mm01), terephthalic acid (3.289 g, 19.8 mmol), and 27.3 g, PPA (77% $P_2O_5$) was placed in a resin flask equipped with a high torque mechanical stirrer, nitrogen inlet/outlet, and a pressure regulator. Under a nitrogen flow, the flask was evacuated by means of a water aspirator pump. The monomers were incorporated into the PPA by stirring, and the resulting mixture was then dehydrochlorinated under reduced pressure (400 mm) by heating as follows: 43° C./18 h; 78° C./8 h; 80° C./16 h; and 98° C./4 h. To this mixture was added, under reduced pressure (690 mm), 16.16 g of $P_2O_5$. With a positive nitrogen flow the mixture was then heated as follows: 145° C./16 h, and 190° C. for 18 h. The polymer was precipitated into water, washed with ammonium hydroxide, water, and methanol, and dried under reduced pressure (0.02 mm) at 110° C. An intrinsic viscosity of 23 dL/g was measured in methanesulfonic acid at 30° C.

Analytic Calcd. for ($C_{14}H_6N_2S_2$) 99%, ($C_{64}H_{36}N_4S_4$) 1%:

C, 63.28; H, 2.29; N, 10.47
Found: C, 62.29; H 2.61; N, 9.94.

EXAMPLE II

A mixture of 4,4''-dicarboxyl-'-phenul-3', 6'-[2-(4-phenoxyphenul)benzthiazole]-p-terphenyl (0.1814 g, 0.2 mmol), 2,5-diamino-1,4-benzededithiol dihydrochloride (4.904 g, 20 mmol), terephthalic acid (3.289 g, 19.8 mmol), and 24.7 g PPA (72.4% $P_2O_5$) was placed in a resin flask equipped with a high torque mechanical stirrer, nitrogen inlet/outlet, and a pressure regulator. Under a nitrogen flow, the flask was evacuated by means of a water aspirator pump. The monomers were incorporated into the PPA by stirring, and the resulting mixture was then dehydrochlorinated under reduced pressure (710 mm) by heating as follows: 45° C./16 h; 70° C./8 h; and 94° C. for 16 h. To this mixture was added, under nitrogen, 27 g P205, then heated slowly to 180° C. and maintained at that temperature for 24 h. The polymer was precipitated into water, washed with ammonium hydroxide, water, and methanol, and dried under reduced pressure (0.02 mm) at 110° C. An intrinsic viscosity of 23.6 dL/g was measured in methanesulfonic acid at 30° C.

Analysis Calcd. for ($C_{14}H_6N_2S_2$) 99%, ($C_{64}H_{36}N_4S_4O_2$) 1%:

C, 63.25; H, 2.28; N, 10.47.
Found; C, 62.89; H, 2.64; N, 9.65.

EXAMPLE III

A mixture of 4,4''-dicarboxy-2'-phenyl-3;,6'-[2-(4-phenoxyphenyl)benzthiazole]-p-terphenyl (0.332 g, 0.4 mmol), 2,5-diamino-1,4-benzenedithiol dihydrochloride (4.904 g, 20 mm01), terephthalic acid (3,276 g, 19.6 mmol) and 25 g PPA (72.4% $P_2O_5$) was placed in a resin flask equipped with a high torque mechanical stirrer nitrogen inlet/outlet, and a pressure regulator. Under a nitrogen flow, the flask was evacuated by means of a water aspirator pump. The monomers were incorporated into the PPA by stirring, and the resulting mixture was then dehydrochlorinated under reduced pressure (710 mm) by heating at 68° C. for 16 h and 95° C. for 8 h. To this mixture was added, under nitrogen, 16.25 g $P_2O_5$, then heated slowly to 155° C. for 4 h and 180° C. for 16 h. The polymer was precipitated into water, washed with ammonium hydroxide, water, and methanol, and dried under reduced pressure (0.02 mm) at 110° C. An intrinsic viscosity of 22.2 dL/g was measured in methanesulfonic acid at 30° C.

Analysis Calcd for ($C_{14}H_6N_2S_2$) 98%, ($C_{64}H_{36}N_4S_4O_2$) 2%:

C, 63.40; H, 2.29; N, 10.42.

Found: C, 62.82; H, 2.55; N, 9.93.

EXAMPLE IV

A mixture of 4,4''-dicarboxy-2',5'-diphenyl-3', 6'-[2-(4-phenyl-benzthiazole)]-p-terphenyl (0.5334 g, 0.6 mmol), 2,5-diamino-1,4-benzenedithiol dihydrochloride (4.904 g, 20 mmol), terephthalic acid (3,223 g, 19.4 mmol), and 27.4 g PPA (77% $P_2O_5$) was placed in a resin flask equipped with a high torque mechanical stirrer, nitrogen inlet/outlet, and a pressure regulator. Under a nitrogen flow, the flask was evacuated by means of a water aspirator pump. The monomers were incorporated into the PPA by stirring, and the resulting mixture was then dehydrochlorinated under reduced pressure (450 mm) by heating at 55° C./16 h and 87.C for 16 h. To this mixture was added, under nitrogen, 16.25 g $P_2O_5$, then heated slowly to 140° C./16 h; 180° C./8 h; and 190° C. for 4 h. The polymer was precipitated into water, washed with ammonium hydroxide, water, and methanol, and dried under reduced pressure at 110° C. An intrinsic viscosity of 22.2 dL/g was measured in methanesulfonic acid at 30° C.

Analysis Calcd. for ($C_{14}H_6N_2S_2$) 97%, ($C_{64}H_{36}N_4S_4$) 3%:

C, 63.56; H, 2.31; N, 10.37.

Found: C, 63.85; H, 2.71; N, 9.90.

Various modifications of the present invention can be made in view of the foregoing disclosure without departing from the spirit and scope of the invention.

We claim:

1. An aromatic heterocyclic copolymer having repeating units of the formula

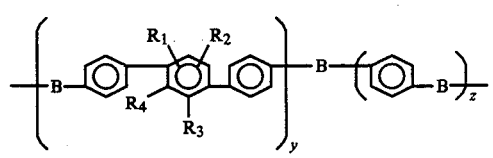

wherein $R_1$ is —H or

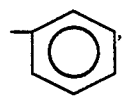

$R_2$ is

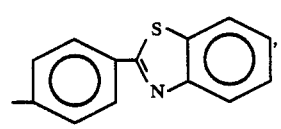

$R_3$ is

and $R_4$ is $R_2$ or

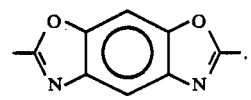

and B is

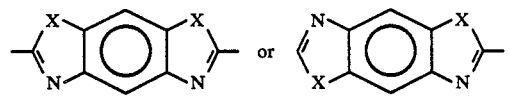

wherein X is —O—; and wherein y ranges from about 0.02 0.20 and z is 1.0-y.

2. The copolymer of claim 1 wherein B is

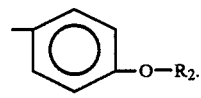

3. The copolymer of claim 2 wherein $R_1$ is —H and $R_4$ is $R_2$.

4. The copolymer of claim 2 wherein $R_1$ is —H and $R_4$ is

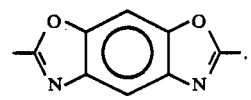

5. The copolymer of claim 2 wherein $R_1$ is

and $R_4$ is $R_2$.

6. The copolymer of claim 2 wherein $R_1$ is

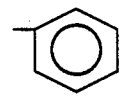

and $R_4$ is

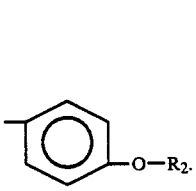

7. The copolymer of claim 1 wherein B is

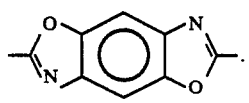
8. The copolymer of claim 7 wherein $R_1$ is —H and $R_4$ is $R_2$.
9. The copolymer of claim 7 wherein $R_1$ is —H and $R_4$ is
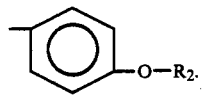
10. The copolymer of claim 7 wherein $R_1$ is
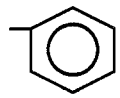
and $R_4$ is $R_2$.
11. The copolymer of claim 7 wherein $R_1$ is
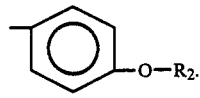
and $R_4$ is
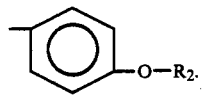
* * * * *

UNITED STATES PATENT AND TRADEMARK OFFICE
CERTIFICATE OF CORRECTION

PATENT NO. : 4,960,853
DATED : October 2, 1990
INVENTOR(S) : Fred E. Arnold et al It is certified that error appears in the above-identified patent and that said Letters Patent is hereby corrected as shown below:

Col 3, line 32, insert a comma after "In general".
Col 3, line 68, insert a comma after "(0.1778 g".
Col 4, line 23, insert a comma after "H".
Col 4, line 27, " -dicarboxyl-'-phenul-3', " should read ---
 -dicarboxyl-2' -phenul-3',---.
Col 4, line 29, "benzededithiol" should read
 ---benzenedithiol---.
Col 4, line 40, "P2O5" should read ---$P_2O_5$---.
Col 4, line 58, insert a comma after "stirrer".
Col 6, claim 1, last line, "0.02 0.20" should read
 ---0.02 to 0.20---.

Signed and Sealed this

Sixteenth Day of June, 1992

Attest:

DOUGLAS B. COMER

Attesting Officer

Acting Commissioner of Patents and Trademarks